March 19, 1940.        F. L. DIETERICH        2,193,807
CEMENTING PRACTICE FOR EARTH WELLS
Filed Jan. 4, 1938
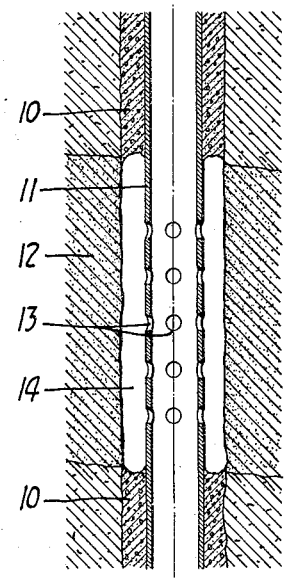
FIG_1_
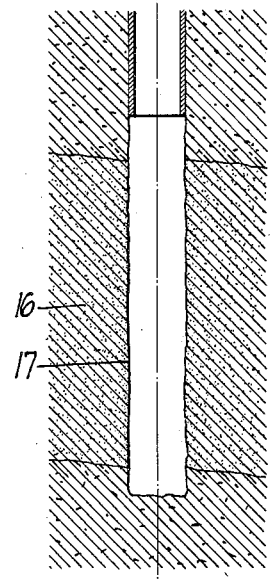
FIG_2_
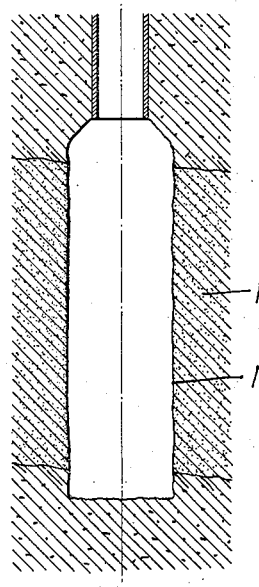
FIG_3_
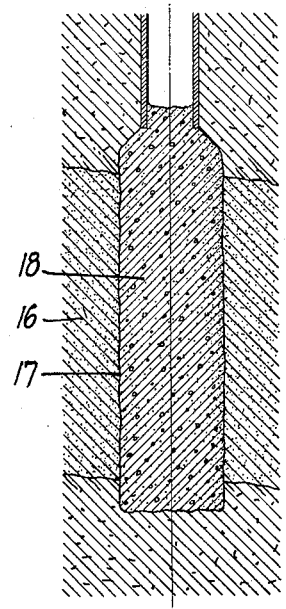
FIG_4_
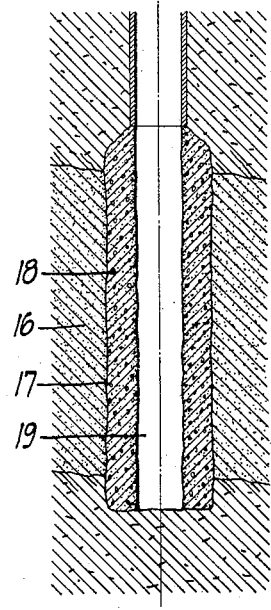
FIG_5_
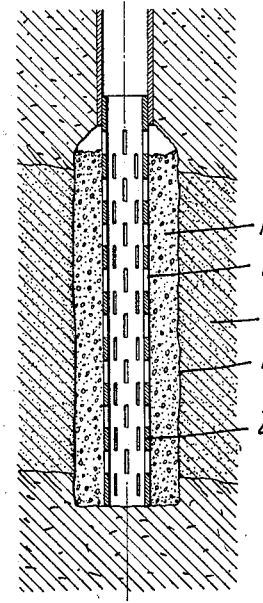
FIG_6_
INVENTOR.
Francis L. Dieterich
BY
ATTORNEY.

Patented Mar. 19, 1940

2,193,807

UNITED STATES PATENT OFFICE 2,193,807

CEMENTING PRACTICE FOR EARTH WELLS

Francis L. Dieterich, Los Angeles, Calif., assignor to The Dow Chemical Company, Midland, Mich., a corporation of Michigan Application January 4, 1938, Serial No. 183,249

4 Claims. (Cl. 166—21)

This invention relates generally to the practice of applying self-setting plastic cements or concrete mixtures to earth wells, in order to afford subterranean closures or supporting walls. More particularly it relates to such practice as applied to oil and gas wells, where closures or supporting walls are frequently required only for temporary periods.

In the petroleum industry it has been common practice to make use of ordinary Portland cement mixes or mortars to oil and gas wells, to afford closures or supporting walls for various parts of the well. Cement walls or plugs formed in this manner are of a permanent nature, and can be removed only with considerable difficulty. For example if the walls of a well are cemented by the use of ordinary Portland cement mortar, so-called back-up operations, making use of a perforating appliance, are rendered difficult because it is necessary to make perforations extending entirely through the relatively thick cement walls. Likewise if a well is plugged by the use of ordinary Portland cement mortar, it is a difficult matter to drill through the plug, if such operations become necessary at some future time.

It is an object of the present invention to facilitate cementing operations of the character described above, particularly by affording a cement mix which, after it has set, is readily amenable to destruction by acid. The invention also has for its object the provision of improved methods made possible by the use of such a cement.

Referring to the drawing:

Fig. 1 is a cross-sectional view in side elevation, showing use of my cement in "back-up" operations.

Figs. 2 to 6 are cross-sectional views in side elevation, showing various stages of a method incorporating my invention, where it is desired to condition the lower end of a well for production from an oil bearing zone.

In practicing the present invention I make use of a Portland cement mix containing a relatively large percentage of calcium carbonate. In many instances it is desirable to eliminate the use of other aggregate materials, like sand or gravel, and to use simply a wet mixture of Portland cement with calcium carbonate. The proportions may vary from one containing say fifty percent Portland cement and fifty percent calcium carbonate (by weight), to one containing about ten percent Portland cement and ninety percent calcium carbonate. When approaching extreme limits such as ninety percent calcium carbonate and ten percent Portland cement, very little strength will be afforded, but for certain purposes as will be presently explained, such a mixture will suffice. In most instances a mix containing about twenty-five percent Portland cement and seventy-five percent calcium carbonate, together with sufficient water to form a mix of the desired consistency, will afford good results.

Ordinary commercial sources of calcium carbonate can be employed, without purification. Thus I have employed crushed oyster shell in powdered form, and also ground or powdered limestone. Such natural forms of calcium carbonate are crystalline, and do not add materially to the viscosity of the mix. If it is desired to provide a mix of greater viscosity, a colloidal or amorphous form of technical calcium carbonate can be used. The cement mix described above will set substantially in the same manner as ordinary concrete mixes, except for some sacrifice in strength, which generally is not of material consideration. After the mix has set it is amenable to ordinary drilling operations. For example if a mix of this kind is utilized to form a closure plug in an earth well, one may subsequently drill through the plug without difficulty, particularly as compared to ordinary cement mortars or mixes. The most remarkable characteristic of such a mix is its property of being readily destroyed by the action of an acid like hydrochloric or sulphuric acid. Contact with an acid like sulphuric acid results in vigorous and sustained reaction, in which the calcium carbonate combines with the acid to form a soluble salt, and to liberate carbon dioxide. Such a reaction results in complete disintegration of the structure, and leaves only a negligible amount of residue, representing mainly the Portland cement content. The residue is in divided form and forms no structure of itself.

Fig. 1 represents one method making use of my cement, and illustrating particularly the manner in which my cement can be employed when it is desired to back-up into the casing which has been set within a well. Thus in this instance the walls of the well are provided with a cement liner 10, made by using my mix, as for example one containing about 25% Portland cement and 75% calcium carbonate. Extending down through the cement liner 10 there is a casing 11, extending to a lower level. If it is desired to produce from a zone 12, a suitable perforating appliance, as for example a gun perforator, is lowered into the casing and operated to form the perforations 13. The steel projectiles which form these perforations 13 need not penetrate through the cement liner 10. Acid is now introduced down through the casing and this acid penetrates through the perforations 13, and acts upon the adjacent portions of the cement walls, whereby the walls are destroyed to afford the void 14. It will be evident that this will now permit production of the well from the zone 12.

In addition to forming plain mixtures of calcium carbonate and Portland cement, I can introduce into such a mixture coarse aggregate material such as gravel, which is not attacked by acid, whereby when the cement mix is eaten away by acid, the gravel is permitted to remain. Thus referring to Fig. 2, it is presumed that a well has been drilled into the production zone 16, and that it is desired to produce from this zone, through a bed of gravel. The first operation is to ream the hole 17, to a larger diameter as indicated in Fig. 3, within the production zone. The next operation illustrated in Fig. 4, is to fill the enlarged bottom end of the well with a solid plug 18, consisting of coarse gravel, together with Portland cement and calcium carbonate. The ratio between the Portland cement and calcium carbonate can be of the order previously indicated, as for example 25% Portland cement and 75% calcium carbonate. After this plug has set, a hole 19 is drilled down through the same, as shown in Fig. 5.

As shown in Fig. 6 a slotted liner 21 is now set within the opening 19, and acid is introduced whereby acid penetrates through the slots in the liner, to attack the mix of Portland cement and calcium carbonate. As a result of the acid action, the intervening bond of Portland cement and calcium carbonate between the gravel, is eaten away, thereby leaving voids between the gravel aggregate, through which oil from the zone 16 may flow.

As an alternative to the practice of using a coarse gravel aggregate together with a mix of Portland cement and calcium carbonate, whereby the mix can be eaten away leaving voids between the gravel, I can make use of coarse balls or fragments of calcium carbonate, having the voids between these fragments filled with acid-resistant cement mix, as for example a mixture of Portland cement with sand. When acid is applied to such a mass the acid eats away the balls or fragments of calcium carbonate, leaving a honey-combed structure of Portland cement and sand.

The subject matter disclosed but not claimed herein is claimed in my co-pending divisional application Serial No. 221,536, filed July 27, 1938.

I claim:

1. In a method for cementing earth wells, forming within the well a closure consisting of a mixture of Portland cement and calcium carbonate, and causing at least partial destruction of said mixture by subjecting the same to the action of acid.

2. In a method for cementing earth wells, forming within the well a side supporting wall consisting of a mixture of Portland cement and at least about 50% calcium carbonate, and causing destruction of said wall by the action of an acid.

3. In a method of cementing earth wells, forming a solid plug within the well, said plug consisting of Portland cement together with a large percentage of powdered or ground calcium carbonate, drilling an opening through said plug, setting a liner within said opening, and then causing the side walls formed by the plug to be eaten away by the action of an acid.

4. In a method of treating wells, cementing a casing in the well with a mixture of Portland cement and calcium carbonate, perforating the casing opposite a desired producing zone, introducing acid into the well and causing the same to pass through the perforations in the casing and act upon the cement to disintegrate the same in the zone adjacent such perforations, thereby opening such zone to production.

FRANCIS L. DIETERICH.